May 1, 1934.  W. S. GRAFF-BAKER  1,956,714
MECHANICAL TRANSMISSION SYSTEM
Filed Sept. 3, 1932  3 Sheets-Sheet 1

William Sebastian Graff-Baker INVENTOR
BY  ATTORNEY

May 1, 1934.  W. S. GRAFF-BAKER  1,956,714
MECHANICAL TRANSMISSION SYSTEM
Filed Sept. 3, 1932   3 Sheets-Sheet 3

William Sebastian Graff-Baker INVENTOR
BY Walter E. S. Bradley ATTORNEY

Patented May 1, 1934

1,956,714

UNITED STATES PATENT OFFICE 1,956,714

MECHANICAL TRANSMISSION SYSTEM

William Sebastian Graff-Baker, Cherry Hill, Higher Denham, England, assignor to Otis Elevator Company, New York, N. Y., a corporation of New Jersey Application September 3, 1932, Serial No. 631,631
In Great Britain July 29, 1932

6 Claims. (Cl. 198—203)

This invention relates to mechanical transmission systems employing chain drives. Certain forms of the invention are particularly adaptable to driving moving stairways.

For some purposes, as in conveying systems, it is desirable to use chains having relatively long, rigid links. The employment of such chains for the running gear chains of moving stairways, for example, so that there is only one set of rigid links between each successive step thereof, is particularly desirable in that it insures constant spacing between steps. The objection to such a construction, however, is that where a relatively constant linear speed of the long link chain is required, as in moving stairways, the sprocket wheel around which such chain passes and by means of which such chain is driven, is ordinarily required to have an appreciable number of teeth, and thus, to be of large size, with the result that the arrangement is therefore cumbersome and expensive.

It is an object of the present invention to provide a transmission system whereby, for any given maximum permissible variation of the linear speed of a chain and for any given length of chain link, the size of the sprocket wheel for such chain and consequently the number of teeth thereon can be made less than with known systems.

According to the present invention, in a mechanical transmission system embodying a chain and a sprocket wheel for driving the same, means are provided for driving such sprocket wheel at an angular speed which varies in such a manner as to reduce the variations of the linear speed of the chain. The angular speed of such sprocket wheel is usually varied periodically at a frequency equal to N times S where N is the number of teeth on the sprocket wheel and S is the speed of the sprocket wheel in revolutions per minute. That is to say, the periodicity of speed variations of the sprocket wheel is made equal to that of the variations of the linear speed of the chain.

Further features of the invention will be hereinafter described and defined in the claims.

In the accompanying drawings:—

Figure 3 is a schematic plan view of a portion of the upper landing equipment illustrated in Figure 2;

Figure 1:
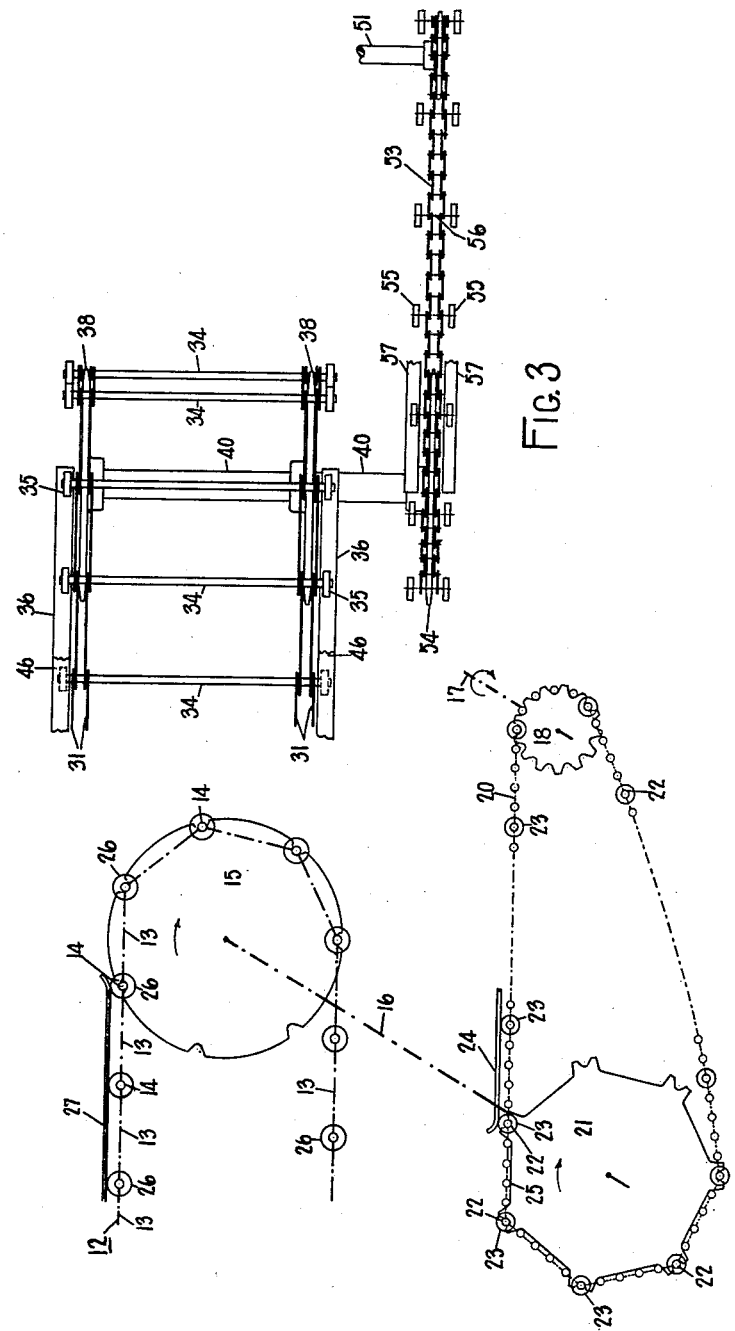
Figure 1 is a schematic diagram of a drive for a long link chain in accordance with this invention.

Referring to Figure 1, a long link chain generally designated 12 comprises a plurality of long links 13 pivotally secured at their ends in any appropriate manner, with suitable chain bushings 14 provided at each joint. Chain 12 engages a sprocket wheel 15 and is driven thereby. As illustrated, sprocket wheel 15 is relatively small in comparison to the length of chain links 13, and in the particular form shown has only seven teeth. Sprocket wheel 15 is suitably secured to a shaft 16.

It is well known that when chain 12 is led onto sprocket wheel 15 in the usual manner, and assuming that shaft 16 is driven clockwise at a uniform angular speed, the linear speed of chain 12 is variable, and that the variations in such linear speed are quite pronounced when a sprocket wheel having a small number of teeth, such as seven, is employed. In accordance with this invention, when it is desired to obtain substantially constant linear speed of chain 12, shaft 16 is driven at a variable angular speed in such manner as to compensate for all or substantially all such variations in linear speed.

The power for driving shaft 16 is derived from a shaft 17 which is driven clockwise at a uniform angular speed by any suitable means, not shown. Upon shaft 17 is mounted a sprocket wheel 18 which, through the intermediary of a chain 20 and a sprocket wheel 21 secured to shaft 16, effects the drive of shaft 16, and thus of sprocket wheel 15. Chain 20 is a short link chain so that its linear speed, as imparted by the uniformly driven sprocket wheel 18, is substantially constant. As illustrated in Figure 1, the chain pitch of chain 20 is one-fifth that of chain 12, with each chain bushing of short link chain 20 adapted to be engaged by a tooth of sprocket 18.

Sprocket wheel 21 is provided with the same number of teeth and angular pitch as the teeth of sprocket wheel 15. Sprocket wheel 21 is formed so that every fifth chain bushing of chain 20 (designated chain bushing 22) engages a tooth of sprocket wheel 21, and also so that the chain links of chain 20 intermediate chain bushings 22 lie along the pitch chords of sprocket wheel 21.

Chain 20 is provided at each bushing which engages a tooth of sprocket 21 (i. e., at each bushing 22) with a pair of rollers 23 overhanging the chain, each preferably of a diameter somewhat larger than the diameter of the chain bushings.

These rollers may be mounted on outwardly projecting pins suitably secured to chain 20 at each bushing 22. In Figure 1 only one of each pair of rollers 23 is illustrated.

Adjacent the point of disengagement of chain 20 from sprocket wheel 21 is a track 24 for rollers 23. Track 24 is mounted above chain 20 in such a relation with chain 20 and rollers 23 that it causes each chain bushing 22, after it has disengaged from sprocket wheel 21, to move in the same direction in which it was moving at the instant of such disengagement. Thus, with the location of shaft 17 and the position of sprocket wheel 21 on shaft 16 as illustrated in Figure 1, chain bushing 22 is moving horizontally at the instant it disengages from sprocket wheel 21 and thus, in continuation of pitch chord 25 of sprocket wheel 21. As a consequence, track 24 is mounted above chain 20 adjacent sprocket wheel 21 so that each chain bushing 22 is forced to move in a horizontal direction after it has disengaged from sprocket wheel 21, even though the next successive chain bushing 22 subsequently moves vertically above the horizontal line passing through the center of such chain bushing 22 at the instant it leaves sprocket wheel 21. In other words, considering the set of short chain links lying along pitch chord 25 of sprocket wheel 21 as shown in Figure 1, track 24 causes the chain bushing 22 of such set nearer sprocket wheel 18 to move in a continuation of pitch chord 25 while the other chain bushing 22 of such set moves around the pitch circle of sprocket wheel 21 to the point at which chain 20 disengages from such sprocket wheel.

Chain 12 is provided at each bushing with one or more rollers 26, each of such rollers preferably being larger in diameter than the diameter of chain bushings 14. Rollers 26 may be mounted, as illustrated in Figure 1, outside chain 12 so that they overhang one or both sides of the same, similar to the manner in which rollers 23 overhang chain 20, or rollers 26 may be mounted between the side links of chain 12 coaxially with chain bushings 14, chain 12 being a double link roller type chain. In the latter instance, rollers 26 may engage the teeth of sprocket wheel 15 rather than chain bushings 14.

Sprocket wheel 15 is secured to shaft 16 so that, at the time pitch chord 25 of sprocket wheel 21 is in alignment with the section of chain 20 that has just disengaged from sprocket wheel 21, the corresponding pitch chord of sprocket wheel 15 is in alignment with the section of chain 12 that is just about to engage with sprocket wheel 15. In addition, a track 27 is mounted above chain 12 adjacent sprocket wheel 15 in such a relationship with chain 12 and rollers 26 that it causes each chain bushing 14, prior to its engagement with sprocket wheel 15, to move in the same direction in which it moves at the instant of engagement with sprocket wheel 15. Thus, with the location of the parts as illustrated in Figure 1, the section of long link chain 12 which is approaching sprocket wheel 15 is horizontal. Track 27 is mounted above chain 12 so that each chain bushing 14 is forced to continue to move in a horizontal direction along a line which is tangent to the circle inscribed within the pitch chords of sprocket wheel 15 while such chain bushings approach such sprocket wheel, even though the preceding chain bushings which have engaged such sprocket wheel move vertically above such horizontal line. This is effected by virtue of the engagement of rollers 26 with track 27.

As a result of the above construction, short link chain 20 leaves sprocket wheel 21 at any instant at the same angle relative to a pitch chord of sprocket wheel 21 as that which the approaching long link chain 12 makes with the corresponding pitch chord of sprocket wheel 15. In addition, short link chain 20 simulates the action of a long link chain in driving sprocket wheel 21. Shaft 16 is thus driven at a variable angular speed although driving shaft 17 rotates at a constant angular speed.

The variations in angular speed of shaft 16 are such that they compensate for the variations in the drive between sprocket wheel 15 and long link chain 12. As a consequence, long link chain 12 is driven at a uniform linear speed. This may be observed by noting that with the position of the parts as illustrated in Figure 1, the angular speed of shaft 16 is a maximum, while the horizontal linear speed imparted to long link chain 12 solely by its relationship to sprocket wheel 15 is a minimum. After sprocket wheel 21 has rotated one-half a tooth pitch so that a chain bushing 22 of chain 20 is directly above the axis of shaft 16, the angular speed of shaft 16 is a minimum. At this time, however, sprocket wheel 15 is in a position so that chain bushing 14 of long link chain 12 is vertically above the axis of shaft 16, in which position the horizontal motion imparted to long link chain 12 solely by its relationship to sprocket wheel 15, is a maximum.

The above arrangement compensates for substantially all of the variations in the linear speed of the long link chain introduced by the employment of a sprocket wheel having a small number of teeth, and may be employed for driving conveying systems at a uniform rate.

Figure 2:
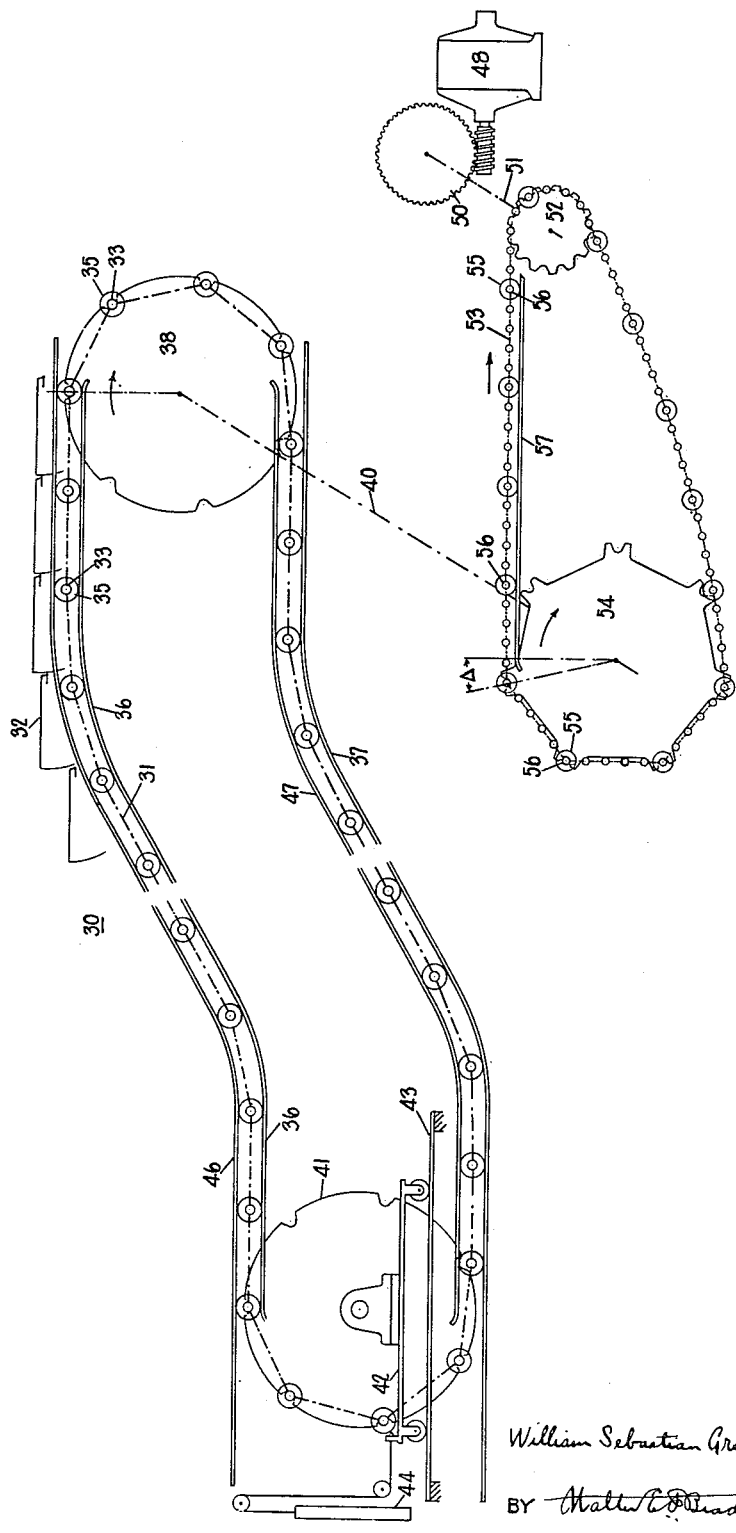
Figure 2 is a schematic diagram of a drive for a moving stairway in accordance with the invention.

Another form of the invention is shown in Figures 2 and 3, this form being particularly adaptable to the drive of moving stairways, in connection with which the invention is illustrated in these figures. It is preferred in many moving stairways that the stairway running gear chains approach the driving sprockets at the upper landing in a horizontal line tangent to the pitch circles of such driving sprockets. With such an arrangement, the displacement of chain bushings 14 of long link chain 12 in Figure 1 above the point at which such chain first engages sprocket wheel 15, is avoided.

Referring to Figures 2 and 3, the moving stairway 30 is provided with a long link running gear chain 31 at each side of the series of steps 32. The two chains are preferably connected at each chain bushing 33 by a step axle 34 extending across the stairway and through the running gear chains. Step wheels or step rollers 35 are mounted on the portions of step axles 34 projecting beyond chains 31. Each step 32 is suitably mounted upon its corresponding step axle 34 between the two running gear chains 31, details of such steps and the mounting thereof on step axles 34 not being shown inasmuch as they form no part of this invention.

Step wheels 35 roll on tracks 36 while the steps are on the upper run of the stairway, and roll on tracks 37 while the steps are on the return run of the stairway. Tracks 36 extend at the upper landing alongside sprocket wheels 38 that drive long link chains 31 up to and slightly beyond a point perpendicularly above the axis of shaft 40 to which sprocket wheels 38 are secured. This insures that steps 32 and chains 31 are continuously supported until chains 31 are seated in sprocket wheels 38.

At the lower landing, running gear chains 31 engage and pass around floating sprocket wheels 41. These wheels are mounted upon a carriage 42 which rolls upon suitable horizontal tracks 43. To carriage 42 is secured a weight 44 for urging the carriage leftwardly, as viewed in Figure 2, so as to maintain chains 31 in tension. If desired, two weights 44 may be employed, one connected to carriage 42 on either side thereof adjacent a sprocket wheel 41.

The ends of tracks 36 at the lower landing extend up to and slightly beyond the vertical centerline of sprockets 41 when they are in their normal position, similarly as with the ends of tracks 36 at the upper landing. Tracks 37 at the upper and lower landings may extend past the centerlines of the sprockets thereat, as illustrated in Figure 2. In addition, upthrust tracks 46 and 47 may be provided for step wheels 35 when rolling on tracks 36 and 37, respectively.

The power for driving moving stairway 30 is derived from a motor 48. By means of suitable reduction gearing 50, motor 48 drives a shaft 51 and a sprocket wheel 52 mounted thereon, which in turn, by means of a short link chain 53, drives a sprocket wheel 54 secured to shaft 40. Sprocket wheel 54 has the same number of teeth and the same angular tooth pitch as sprocket wheels 38. Short link chain 53 is constructed similarly as short link chain 20 shown in Figure 1, with rollers 55 mounted thereon at every chain bushing 56 that is engaged by a tooth of sprocket wheel 54. Sprocket wheel 54 is also formed similarly as sprocket wheel 21 shown in Figure 1, so that the chain bushings of the short link chain intermediate the chain bushings thereof which are engaged by the teeth of sprocket wheel 21 lie along the pitch chords of such sprocket wheel.

Rollers 55 on short link chain 53 roll upon tracks 57 which are positioned below the section of chain 53 that is leaving sprocket wheel 54. Tracks 57 are so positioned that they cause chain 53 to leave sprocket wheel 54 along a line tangent to the pitch circle of sprocket wheel 54. The end of each track 57 extends alongside sprocket wheel 54 up to and slightly beyond a point perpendicularly above the axis of shaft 40, similarly as with the ends of tracks 36 adjacent sprocket wheels 38. As a result of the above construction, chain 53 simulates a long link chain as it leaves sprocket wheel 54.

Assume for the moment that sprocket wheel 54 is secured to shaft 40 so that a chain bushing 56 of short link chain 53 is vertically above the centerline of shaft 40 and is just disengaging from sprocket wheel 54, while a chain bushing 33 of long link chain 31 is vertically above the centerline of shaft 40 and is just engaging sprocket wheel 38. Such an arrangement compensates to some degree for the variations in linear speed of long link chain 31 caused by the drive from sprocket wheel 38 to long link chain 31. The linear speed of the long link chain is, however, not entirely uniform due to the fact that the variations in speed between short link chain 53 and sprocket wheel 54 is asymmetrical with respect to the variations in speed between sprocket wheel 38 and long link chain 31. As a consequence, the product of such asymmetrical curves is not always unity, unity for such product being necessary in order that long link chain 31 may have a constant linear speed similarly as has short link chain 53.

Additional compensation may be effected, however, so as to further reduce the speed variations in long link chain 31, by displacing sprocket wheel 54 a suitable fraction of a pitch around its axis of rotation relatively to sprocket wheel 38. The amount of displacement may be determined by shifting the speed ratio curve of the short link chain 53 and sprocket wheel 54 unit with respect to the speed ratio curve of the long link chain 31 and sprocket wheel 38 unit so that the product of these two curves approximates unity as nearly always as possible. As illustrated in Figure 2, sprocket wheel 54 has been displaced backwardly with respect to sprocket wheel 38 a certain angle designated $\Delta$.

The practical results of the arrangement disclosed in Figures 2 and 3 are indicated from the following actual data:

In a moving stairway employing long link chains having a chain pitch of 16 inches (so that the step pitch is also 16 inches) and employing seven tooth driving sprockets, having a radius of 18.47 inches, for sprockets 38, and assuming first that sprocket wheels 38 are driven at a uniform angular speed in the customary manner, the linear speed of long link chains 31, and of steps 32, varies from normal speed (which is taken as unity), to .942 of such speed—a total variation of 5.8%. When a moving stairway having the same dimensions is driven in accordance with this invention as shown in Figures 2 and 3, and the displacement $\Delta$ of sprocket wheel 54 is 12°, and assuming that short link chain 53 is driven at a constant linear speed, the linear speed of long link chain 31 varies from .985 to 1.014—a total variation of 2.9%. These variations in linear speed of long link chains 53 are of a roughly harmonic form and of twice the frequency of the speed variations introduced solely by the drive unit comprising sprocket wheel 38 and long link chain 31.

Figure 4:
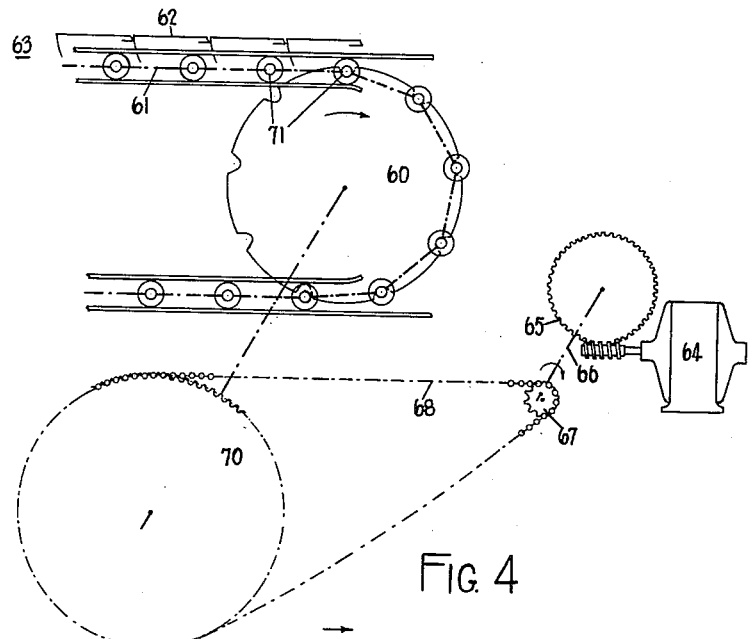
Figure 4 is a schematic diagram of a modified form of drive for a moving stairway in accordance with the invention.
Figure 5:
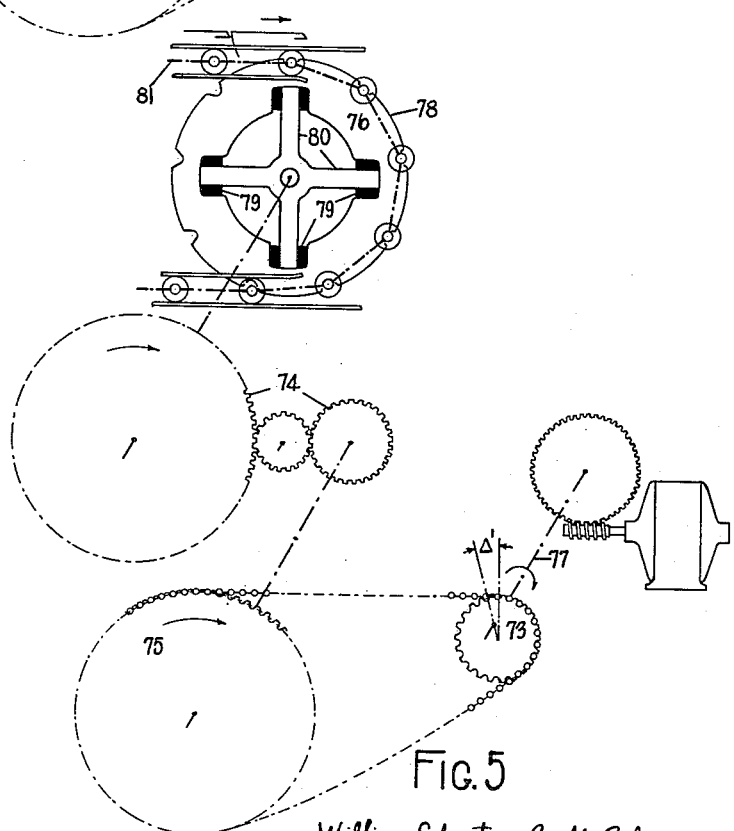
Figure 5 is a schematic diagram enlarging upon the form of the invention illustrated in Figure 4.

Figures 4 and 5 disclose an alternate method of reducing the variations in linear speed of a long link chain where such long link chain approaches a sprocket wheel therefor on a line tangential to the pitch circle of such sprocket wheel. Such method consists in driving the sprocket wheel engaging the long link chain at a variable angular speed by means of a short link chain drive in which the driving sprocket for such short link chain is eccentrically mounted.

This is diagrammatically illustrated in Figure 4, in which sprocket wheel 60 engaging the long link chain 61 of moving stairway 63, similar to moving stairway 30 shown in Figures 2 and 3, is driven from motor 64 through the intermediary of reduction gearing 65, sprocket wheel 67, short link chain 68 and sprocket wheel 70. The shaft 66 upon which sprocket wheel 67 is mounted is rotated at a uniform angular speed. The chain pitch of short link chain 68 is such that the speed ratio between sprocket wheel 67 and chain 68 is unity for all practical purposes—in other words, so that there is no error introduced in the arrangement at sprocket wheel 67.

Sprocket wheel 67 is eccentrically mounted upon shaft 66. This eccentric sprocket wheel is of such size that it rotates at an angular speed N times the angular speed of sprocket wheel 60, where N is the number of teeth on sprocket wheel 60. In other words, the size of eccentric sprocket wheel 67 is such that it makes one complete revolution while sprocket wheel 60 rotates one angular tooth pitch thereof.

The result of the above construction is that sprocket wheel 60 is rotated at a variable angular speed, such variations in speed being sinusoidal and going through one complete cycle during movement of sprocket wheel 60 one angular tooth pitch thereof.

In the position of the parts as illustrated in Figure 4, eccentric sprocket wheel 67 is positioned on shaft 66 so that the upper section of short link chain 68 engages eccentric sprocket wheel 67 at substantially its minimum radius. Thus, an eccentric sprocket wheel 67 rotates clockwise one complete revolution from the position shown in Figure 4, the angular speed of sprocket wheel 60 is initially its minimum, then increases to its maximum when the eccentric sprocket wheel has rotated substantially one-half a revolution, and then returns to its initial minimum angular speed when the eccentric sprocket wheel returns to its initial position. During this cycle, sprocket wheel 60 moves from its initial position in which a bushing 71 of long link chain 61 is just engaging sprocket wheel 60 to a position in which the next succeeding chain bushing 71 of long link chain 61 is just engaging sprocket wheel 60. During this cycle, in the event sprocket wheel 60 were rotated at uniform rate, the linear speed that would be imparted to the portion of long link chain 61 approaching sprocket wheel 60 would be a maximum at the beginning, would fall to a minimum at a position of sprocket wheel 60 where it has rotated something more than half an angular tooth pitch, and would then increase to its maximum at the end of such cycle.

It may thus be seen that with the invention as shown in Figure 4, the angular speed of sprocket wheel 60 is increased while the drive unit comprising sprocket 60 and chain 61 tends to impart to chain 61 a slower linear speed, so that the overall net result is that the linear speed of chain 61 is substantially constant.

The eccentricity of sprocket wheel 67 may ordinarily be made such as will exactly correct for the maximum speed variation introduced by the drive from sprocket wheel 60 to long link chain 61. This may be determined from the formula $$\frac{r+e}{r-e} \cdot k = 1$$

where $e$ = eccentricity of sprocket wheel 67
$r$ = radius of sprocket wheel 67
$k$ = minimum ratio of speed of long link chain 61 with respect to sprocket wheel 60, assuming the maximum ratio of such speed to equal unity.

In view of the asymmetrical form of the speed ratio curve between sprocket wheel 60 and long link chain 61, when chain 61 approaches sprocket wheel 60 tangentially to the pitch circle of such sprocket wheel as illustrated in Figure 4, eccentric sprocket wheel 67 is usually angularly displaced a small amount about its axis of rotation so as to cause the product of the sinusoidal speed ratio curve caused by eccentric sprocket 67 with the asymmetrical speed ratio curve of the drive between sprocket wheel 60 and long link chain 61, to more nearly approach unity at all times. Such angular displacement of eccentric sprocket wheel 67 is not shown in Figure 4. It is shown in Figure 5 for a similar eccentric sprocket wheel 73, where such angular displacement is designated $\Delta'$.

The practical results of the above arrangement disclosed in Figure 4 are indicated from the following actual data:

In a moving stairway employing long link chains with a chain pitch of 16 inches (so that the step pitch is also 16 inches) and employing a nine tooth driving sprocket, having a radius of 23.45 inches, for sprocket wheel 60, and assuming first that sprocket wheel 60 is driven at a uniform angular speed in the customary manner, the linear speed of long link chain 61, and thus of the stairway steps 62, varies from normal speed (which is taken as unity) to .964 of such speed—a total variation of 3.6%. When a moving stairway having the same dimensions is driven in accordance with this invention as shown in Figure 4, with sprocket wheel 67 having an eccentricity $e$ of 1.84% and a displacement of $\Delta'$ of 5° N x 5° or 45° (N being the ratio between the angular speeds of sprocket wheels 67 and 60, which is also equal to the number of teeth on sprocket wheel 60), and assuming that shaft 66 is driven at a constant angular speed, the linear speed of long link chain 61 varies from 0.994 to 1.005—a total variation of 1.1%. These variations in linear speed of long link chain 61 are of a harmonic form having twice the frequency of the speed variations introduced solely by the drive between sprocket wheel 60 and long link chain 61. A total variation of 1.1% in the linear speed of long link chain 61 approaches that which would result if long link chain 61 were driven in the customary manner by a nineteen tooth sprocket, having a radius of 48.48 inches without compensation in accordance with this invention. A nineteen tooth sprocket under such conditions causes a total variation of 0.8% in the linear speed of a long link chain having a chain pitch of 16 inches. The large diameter of such a nineteen tooth sprocket (96.96 inches, or a little over eight feet), however, is an indication of the practical difficulties that are encountered, particularly in moving stairways, when long link chains are attempted to be driven at a substantially uniform linear speed by means of the customary driving equipment. In contrast, it is to be noted that when long link chain 61 is driven by a nine tooth sprocket wheel 60 in accordance with the foregoing data, the diameter of such sprocket wheel 60 is only 46.90 inches, or something less than four feet.

In applying the principles of this invention as shown in Figure 4 to a moving stairway, the expedients illustrated in Figure 5 may be employed to facilitate the practical use of the same. Eccentric sprocket wheel 73 may be made of a more convenient size than sprocket wheel 67 illustrated in Figure 4. Under such circumstances, reduction gearing 74 may be interposed between sprocket wheel 75 and sprocket wheel 76, corresponding to sprocket wheels 70 and 60, respectively, of Figure 4, so that the overall speed ratio between shaft 77, upon which eccentric sprocket wheel 73 is mounted, and sprocket wheel 76, continues to be in the ratio of N to 1, where N equals the number of teeth in sprocket wheel 76.

Sprocket wheel 76 may be constructed so that the teeth thereof are formed in a ring 78 which is resiliently mounted upon the spokes 80 of such sprocket wheel. Such resilient mounting for ring 78 is indicated as obtained by cushions 79, such as rubber, interposed between the ends of spokes 80 and ring 78. Cushions 79 tend to smooth out any sharp peaks in the final linear speed variations of long link chain 81.

As a further refinement of the invention as disclosed in Figure 4, it has been found that by making the eccentricity greater than the value indicated above when discussing Figure 4, the total speed variation of long link chain 81 may be further reduced and the resulting speed ratio curve made more nearly sinusoidal. This increase in eccentricity of sprocket wheel 73 is determined by so varying the maximum amplitude and displacement of the sinusoidal speed ratio curve caused by the action of eccentric sprocket wheel 73 with respect to the asymmetrical speed ratio curve of the drive between sprocket wheel 76 and long link chain 81, that the product of the two curves throughout one cycle more nearly averages unity than in the prior determinations. Thus, by changing the eccentricity e of eccentric sprocket wheel 73 from 1.84% to 3.98% and changing the displacement Δ' thereof on shaft 77 from N x 5° (or 45°) to N x 4.75° (or 42.75°) the total variation in linear speed of long link chain 81 may be reduced from 1.1% to 0.9%. It may be seen that this total variation in linear speed of long link chain 81 very closely approximates the total variation of 0.8% resulting when a nineteen tooth sprocket is employed to drive the chain 81 in the customary manner.

If desired, the eccentric sprocket wheel method of compensation shown in Figures 4 and 5 may be combined with the method of compensation shown in Figures 2 and 3 (which method may be termed a duplicate chain method) so as to obtain a still more uniform linear speed of the long link chain. In such case, the periodicity of the speed variations to be corrected for by the eccentric sprocket wheel, after as much compensation has been obtained as desired and obtainable by the duplicate chain method, is twice that when the eccentric sprocket wheel method of compensation is used alone. As a consequence, the angular speed of the eccentric sprocket wheel must therefore be 2N times the angular speed of the sprocket wheel engaging the long link chain, where N, as before, is the number of teeth in such sprocket wheel.

For simplicity, this invention has been described and illustrated upon the assumption that the long link chains are to be driven so that the upper run of each thereof approaches the drive sprocket therefor. It is clear that if any of such long link chains is to be driven in the reverse direction in acordance with this invention, adjustments must be made to the equipment already provided and in certain instances additional track provided, in order that the principles of this invention can as effectively be utilized when such long link chain is driven in such reverse direction as when driven in the direction illustrated in the drawings.

Inasmuch as many changes could be made in the above constructions and many apparently widely different embodiments of this invention could be made without departing from the scope thereof, it is intended that all matter contained in the above description or shown in the accompanying drawings shall be interpreted as illustrated and not in a limiting sense.

What is claimed is:

1. In a moving stairway; an endless long link running gear chain; a sprocket wheel for driving the same, said sprocket wheel having a relatively small number of teeth; means for maintaining the following end of each long link as it engages said driving sprocket wheel in a line tangential to the pitch circle of said sprocket wheel; a power shaft driven at a constant angular speed; and mechanical connections between said power shaft and said sprocket wheel driving said sprocket wheel therefrom at a cyclically varying angular speed to compensate for the varying speed ratio between said sprocket wheel and said long link chain so that said long link chain has a substantially uniform linear speed.

2. In a moving stairway; an endless long link running gear chain; a sprocket wheel for driving the same, said sprocket wheel having a relatively small number of teeth; means for maintaining the following end of each long link as it engages said driving sprocket wheel in a line tangential to the pitch circle of said sprocket wheel; a power shaft driven at a constant angular speed; and mechanical connections between said power shaft and said sprocket wheel driving said sprocket wheel therefrom at a cyclically varying angular speed to compensate for the varying speed ratio between said sprocket wheel and said long link chain so that said long link chain has a substantially uniform linear speed, said connections including a chain-and-sprocket reduction drive in which the driving sprocket wheel of said chain-and-sprocket reduction drive is eccentrically mounted, and in which the links of the chain of said reduction drive are short in comparison to the length of the links of said long link chain.

3. In a moving stairway; an endless series of steps; an endless running gear chain connecting said steps, the chain pitch of said chain being uniform and equal to the step pitch of said steps with the result that the links of said chain are relatively long; a sprocket wheel for driving said chain, said sprocket wheel having a relatively small number of teeth; and means for causing said chain, and thus said steps, to be driven by said sprocket wheel at a substantially uniform linear speed, said means comprising, a power shaft driven at a constant angular speed, mechanical connections between said power shaft and said sprocket wheel driving said sprocket wheel at a cyclically varying angular speed, and means, including step rollers for said steps and a track for said step rollers, for maintaining the following end of each long link as it engages its said driving sprocket wheel in a line tangential to the pitch circle of said sprocket wheel.

4. In a moving stairway; an endless series of steps; an endless running gear chain connecting said steps, the chain pitch of said chain being uniform and equal to the step pitch of said steps with the result that the links of said chain are relatively long; a sprocket wheel for driving said chain, said sprocket wheel having a relatively small number of teeth; and means for causing said chain, and thus said steps, to be driven by said sprocket wheel at a substantially uniform linear speed, said means comprising, a power shaft driven at a constant angular speed, mechanical connections including a chain-and-sprocket reduction drive in which the driving sprocket wheel of said chain-and-sprocket reduction drive is eccentrically mounted, and in which the links of the chain of said reduction drive are short in comparison to the length of the links of said long link chain, between said power shaft and said sprocket wheel driving said sprocket wheel at a cyclically varying angular speed, and means, including step rollers for said steps and a track for said step rollers, for maintaining the following end of each long link as it engages its said driving sprocket wheel in a line tangential to the pitch circle of its said sprocket wheel.

5. In a moving stairway; an endless long link running gear chain; a sprocket wheel for driving the same, said sprocket wheel having a relatively small number of teeth; means for maintaining the following end of each long link as it engages said driving sprocket wheel in a line tangential to the pitch circle of said sprocket wheel; a power shaft driven at a constant angular speed; and mechanical connections between said power shaft and said sprocket wheel driving said sprocket wheel therefrom at a cyclically varying angular speed to compensate for the varying speed ratio between said sprocket wheel and said long link chain so that said long link chain has a substantially uniform linear speed, said sprocket wheel for said long link chain being driven at an angular speed somewhat greater than its minimum angular speed when the leading end of said long link chain is just engaging its sprocket wheel.

6. In a moving stairway; an endless long link running gear chain; a sprocket wheel for driving the same, said sprocket wheel having a relatively small number of teeth; means for maintaining the following end of each long link as it engages said driving sprocket wheel in a line tangential to the pitch circle of said sprocket wheel; a power shaft driven at a constant angular speed; and mechanical connections between said power shaft and said sprocket wheel driving said sprocket wheel therefrom at a cyclically varying angular speed to compensate for the varying speed ratio between said sprocket wheel and said long link chain so that said long link chain has a substantially uniform linear speed, said connections including a chain-and-sprocket reduction drive in which the driving sprocket wheel of said chain-and-sprocket reduction drive is eccentrically mounted, and in which the links of the chain of said reduction drive are short in comparison to the length of the links of said long link chain the eccentrically-mounted driving sprocket wheel for the short link chain being positioned upon its shaft so that when the leading end of a link of said long link chain is just engaging the sprocket wheel for said long link chain, the eccentrically-mounted driving sprocket wheel is displaced rearwardly a small angular distance from the position in which it drives the sprocket wheel for said long link chain at its minimum angular speed, with the result that at the moment the leading end of a link of said long link chain is just engaging its sprocket wheel, said sprocket wheel for the long link chain is being driven at an angular speed somewhat greater than its minimum angular speed.

WILLIAM SEBASTIAN GRAFF-BAKER.